United States Patent
Liu (10) Patent No.: US 10,412,057 B2
(45) Date of Patent: Sep. 10, 2019

(54) SERVICE ACCESS METHOD AND SYSTEM, AND APPARATUS

(71) Applicant: Huawei Technologies Co., Ltd., Shenzhen (CN)

(72) Inventor: Cheng Liu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 332 days.

(21) Appl. No.: 15/390,974

(22) Filed: Dec. 27, 2016

(65) Prior Publication Data
US 2017/0111329 A1 Apr. 20, 2017

Related U.S. Application Data

(63) Continuation of application No. PCT/CN2015/076094, filed on Apr. 8, 2015.

(30) Foreign Application Priority Data

Jul. 2, 2014 (CN) .......................... 2014 1 0312944

(51) Int. Cl.
*H04L 29/06* (2006.01)
*G06F 16/951* (2019.01)
*H04L 29/08* (2006.01)

(52) U.S. Cl.
CPC ........ *H04L 63/0428* (2013.01); *G06F 16/951* (2019.01); *H04L 29/08* (2013.01);
(Continued)

(58) Field of Classification Search
CPC ........... H04L 63/0428; H04L 29/06068; H04L 29/08; H04L 63/0281; H04L 63/062;
(Continued)

(56) References Cited

U.S. PATENT DOCUMENTS 6,219,790 B1 * 4/2001 Lloyd ..................... G06F 21/31
726/14
7,237,261 B1 6/2007 Huber et al.
(Continued)

FOREIGN PATENT DOCUMENTS

CN 1556634 A 12/2004
CN 1558584 A 12/2004
(Continued)

OTHER PUBLICATIONS

Kim et al., Scalable message translation mechanism for the environment of heterogeneous middleware, Feb. 2007, IEEE Transactions on Consumer Electronics, vol. 53, No. 1, pp. 108-113 (Year: 2007).*

(Continued)

*Primary Examiner* — Kenneth W Chang
(74) *Attorney, Agent, or Firm* — Conley Rose, P.C.

(57) ABSTRACT

A service access method and an apparatus. A secure transmission proxy apparatus performs verification and management on service permission, which reduces networking costs of a service server side and workload of reconstruction and maintenance of the service server side, and enhances communication security. A solution includes: decrypting, by a secure transmission proxy apparatus, a service request message sent by a client, where the service request message includes a service type; performing verification on service permission of a decrypted service request message according to the service type; performing protocol conversion on the decrypted service request message if the service permission verification succeeds; and sending a service request message obtained after the protocol conversion to a service server side, so that the service server side executes a corresponding service according to the service request message obtained after the protocol conversion.

16 Claims, 5 Drawing Sheets

(52) U.S. Cl.
CPC ........ *H04L 63/0281* (2013.01); *H04L 63/062* (2013.01); *H04L 63/10* (2013.01); *H04L 67/306* (2013.01); *H04L 69/08* (2013.01); H04L 29/06 (2013.01)

(58) Field of Classification Search
CPC ....... H04L 63/10; H04L 67/306; H04L 69/08; G06F 16/951
See application file for complete search history.

(56) References Cited

U.S. PATENT DOCUMENTS

| | | | | |
|---|---|---|---|---|
| 8,867,539 | B2* | 10/2014 | Glasser | H04L 12/1836 370/390 |
| 2002/0116637 | A1 | 8/2002 | Deitsch et al. | |
| 2004/0030887 | A1* | 2/2004 | Harrisville-Wolff | H04L 63/0442 713/155 |
| 2004/0225657 | A1* | 11/2004 | Sarkar | G06Q 10/06 |
| 2007/0288487 | A1* | 12/2007 | Song | H04L 12/2818 |
| 2009/0049200 | A1* | 2/2009 | Lin | G06F 16/258 709/246 |
| 2013/0151400 | A1* | 6/2013 | Makhotin | G06Q 20/3227 705/39 |

FOREIGN PATENT DOCUMENTS

| | | |
|---|---|---|
| CN | 101552989 A | 10/2009 |
| CN | 101753561 A | 6/2010 |
| CN | 102104607 A | 6/2011 |
| CN | 102291796 A | 12/2011 |
| CN | 103001962 A | 3/2013 |
| CN | 103428700 A | 12/2013 |
| WO | 0119102 A1 | 3/2001 |
| WO | 2013093474 A1 | 6/2013 |

OTHER PUBLICATIONS

Foreign Communication From a Counterpart Application, European Application No. 15814144.0, European Office Action dated Aug. 27, 2018, 5 pages.

Machine Translation and Abstract of Chinese Publication No. CN1556634, Dec. 22, 2004, 10 pages.

Machine Translation and Abstract of Chinese Publication No. CN103001962, Mar. 27, 2013, 28 pages.

Foreign Communication From a Counterpart Application, Chinese Application No. 201410312944.2, Chinese Office Action dated Dec. 27, 2017, 7 pages.

Machine Translation and Abstract of Chinese Publication No. CN101753561, Jun. 23, 2010, 5 pages.

Machine Translation and Abstract of Chinese Publication No. CN102291796, Dec. 21, 2011, 8 pages.

Foreign Communication From a Counterpart Application, European Application No. 15814144.0, Extended European Search Report dated Mar. 30, 2017, 7 pages.

Foreign Communication From a Counterpart Application, PCT Application No. PCT/CN2015/076094, English Translation of International Search Report dated Jun. 30, 2015, 2 pages.

Foreign Communication From a Counterpart Application, PCT Application No. PCT/CN2015/076094, English Translation of Written Opinion dated Jun. 30, 2015, 6 pages.

* cited by examiner

SERVICE ACCESS METHOD AND SYSTEM, AND APPARATUS

CROSS-REFERENCE TO RELATED APPLICATIONS

This application is a continuation application of international patent application number PCT/CN2015/076094 filed on Apr. 8, 2015, which claims priority to Chinese patent application number 201410312944.2 filed on Jul. 2, 2014, which are incorporated by reference.

TECHNICAL FIELD

The present disclosure relates to the field of communications technologies, and in particular, to a service access method and system, and an apparatus.

BACKGROUND

With continuous development of communications network technologies, currently, a business support system (BSS) has developed gradually from an internal network to the Internet. The BSS is a service operation and management platform provided by a telecommunications service operations system, for example, systems such as charging, settlement, accounting, customer service, and business. When a user performs a service operation on a client, a service request is sent to each BSS in an internal network by using the Internet. When the BSS receives a service request from an external network, because the BSS involves a large amount of private sensitive information of customers, in view of security, the client needs to communicate with a service server side by using a standard security protocol, for example, the Hypertext Transfer Protocol Secure (HTTPS) protocol.

In a BSS service system networking solution in some approaches, generally, a security certificate is separately published to a client by using each BSS in the internal network, the client encrypts the service request according to the security certificate. If a client needs to use services provided by multiple BSS's in the internal network, the client needs to import multiple security certificates and select different certificates according to different services to encrypt the service request, so as to ensure security of communication between the client and the service server side.

Because each BSS needs to externally publish a security certificate and perform security verification, for a BSS with heavy access traffic and a high performance requirement, to avoid response timeout and meet the performance requirement, a capacity of a device needs to be expanded, increasing networking costs. In addition, because of division of service fields of the BSS itself, each service system server side needs to publish a certificate, leading to difficulty in maintenance, and also increasing workload of reconstruction and maintenance of the client.

SUMMARY

Embodiments of the present disclosure provide a service access method and an apparatus. A secure transmission proxy apparatus performs verification and management on service permission, which reduces networking costs of a service server side and workload of reconstruction and maintenance of the service server side, and enhances communication security.

To achieve the foregoing objective, the following technical solutions are used in the embodiments of the present disclosure.

According to a first aspect, an embodiment of the present disclosure provides a secure transmission proxy apparatus, including: a receiving unit configured to receive a service request message sent by a client; a decryption unit configured to decrypt the service request message, where the service request message includes a service type; a verification unit configured to perform verification on service permission of a decrypted service request message according to the service type; a conversion unit configured to perform protocol conversion on the decrypted service request message if the service permission verification succeeds; and a sending unit configured to send a service request message obtained after the protocol conversion to a service server side, so that the service server side executes a corresponding service according to the service request message obtained after the protocol conversion.

In a first possible implementation manner of the first aspect, with reference to the first aspect, the service request message further includes at least a message channel and user information; the verification unit is configured to: perform first verification on the service permission according to the message channel and the service type, and perform second verification on the service permission according to the user information and the service type if the first verification succeeds; and the conversion unit is configured to perform protocol conversion on the decrypted service request message after the second verification succeeds.

In a second possible implementation manner of the first aspect, with reference to the first possible implementation manner of the first aspect, the verification unit is specifically configured to search a preset database for a first service type corresponding to the message channel, where the first verification succeeds if the service type is any service type in the first service type.

In a third possible implementation manner of the first aspect, with reference to the second possible implementation manner of the first aspect, the verification unit is specifically configured to search the preset database for a first permission value corresponding to the user information and search the preset database for a second permission value corresponding to the service type, where the second verification succeeds if the first permission value is greater than or equal to the second permission value; and the conversion unit is configured to perform protocol conversion on the decrypted service request message after the second verification succeeds.

In a fourth possible implementation manner of the first aspect, with reference to the second possible implementation manner of the first aspect, the verification unit is specifically configured to: search the preset database for a first home service system and a third permission value that are corresponding to the user information, and search the preset database for a second home service system and a fourth permission value that are corresponding to the service type, where the second verification succeeds if the first home service system is the same as the second home service system and the third permission value is greater than or equal to the fourth permission value; and the conversion unit is configured to perform protocol conversion on the decrypted service request message after the second verification succeeds.

In a fifth possible implementation manner of the first aspect, with reference to the first aspect and the fourth possible implementation manner of the first aspect, the decrypted service request message carries a first protocol identifier, and the conversion unit is specifically configured to convert the first protocol identifier carried in the decrypted service request message to a second protocol identifier that can be identified by the service server side.

In a sixth possible implementation manner of the first aspect, with reference to the first aspect and the fourth possible implementation manner of the first aspect, the apparatus further includes: an adaptation unit configured to perform protocol adaptation on the service request message.

In a seventh possible implementation manner of the first aspect, with reference to the first aspect and the fourth possible implementation manner of the first aspect, the sending unit is further configured to publish a security certificate to the client, so that the client encrypts the service request message according to the security certificate.

In an eighth possible implementation manner of the first aspect, with reference to the first aspect, the sending unit is further configured to send a request failure message to the client if the service permission verification fails.

According to a second aspect, an embodiment of the present disclosure provides a client, including: an obtaining unit configured to obtain a service request message; an encryption unit configured to encrypt the service request message; and a sending unit configured to send an encrypted service request message to a secure transmission proxy apparatus.

In a first possible implementation manner of the second aspect, with reference to the second aspect, the client further includes: a loading unit configured to load a security certificate published by the secure transmission proxy apparatus.

In a second possible implementation manner of the second aspect, with reference to the second aspect and the first possible implementation manner of the second aspect, the service request message carries a first protocol identifier.

According to a third aspect, an embodiment of the present disclosure provides a service access system, including: at least one client described above, a load balancer, at least one service server side, and the secure transmission proxy apparatus described above, where the at least one client is connected to the load balancer, the load balancer is connected to the secure transmission proxy apparatus, and the secure transmission proxy apparatus is connected to the at least one service server side.

According to a fourth aspect, an embodiment of the present disclosure provides a service access method, including: receiving a service request message sent by a client, and decrypting the service request message, where the service request message includes a service type; performing verification on service permission of a decrypted service request message according to the service type; performing protocol conversion on the decrypted service request message if the service permission verification succeeds; and sending a service request message obtained after the protocol conversion to a service server side, so that the service server side executes a corresponding service according to the service request message obtained after the protocol conversion.

In a first possible implementation manner of the fourth aspect, with reference to the fourth aspect, the service request message further includes at least a message channel and user information, and the performing verification on service permission of a decrypted service request message according to the service type includes: performing first verification on the service permission according to the message channel and the service type; and performing second verification on the service permission according to the user information and the service type if the first verification succeeds.

In a second possible implementation manner of the fourth aspect, with reference to the first possible implementation manner of the fourth aspect, the performing first verification on the service permission according to the message channel and the service type specifically includes: searching a preset database for a first service type corresponding to the message channel, where the first verification succeeds if the service type is any service type in the first service type.

In a third possible implementation manner of the fourth aspect, with reference to the second possible implementation manner of the fourth aspect, the performing second verification on the service permission according to the user information and the service type specifically includes: searching the preset database for a first permission value corresponding to the user information; and searching the preset database for a second permission value corresponding to the service type; where the second verification succeeds if the first permission value is greater than or equal to the second permission value.

In a fourth possible implementation manner of the fourth aspect, with reference to the second possible implementation manner of the fourth aspect, the performing second verification on the service permission according to the user information and the service type specifically includes: searching the preset database for a first home service system and a third permission value that are corresponding to the user information; and searching the preset database for a second home service system and a fourth permission value that are corresponding to the service type; where the second verification succeeds if the first home service system is the same as the second home service system and the third permission value is greater than or equal to the fourth permission value.

In a fifth possible implementation manner of the fourth aspect, with reference to the fourth aspect and the first possible implementation manner of the fourth aspect, the decrypted service request message carries a first protocol identifier, and the performing protocol conversion on the decrypted service request message includes: converting the first protocol identifier carried in the decrypted service request message to a second protocol identifier that can be identified by the service server side.

In a sixth possible implementation manner of the fourth aspect, with reference to the fourth aspect and the first possible implementation manner of the fourth aspect, before the decrypting the service request message, the method further includes: performing protocol adaptation on the service request message.

In a seventh possible implementation manner of the fourth aspect, with reference to the fourth aspect and the fourth possible implementation manner of the fourth aspect, before the receiving a service request message sent by a client, the method further includes: publishing a security certificate to the client, so that the client encrypts the service request message according to the security certificate.

In an eighth possible implementation manner of the fourth aspect, with reference to the fourth aspect, after the performing verification on service permission of a decrypted service request message according to the service type, the method further includes: sending a request failure message to the client if the service permission verification fails.

According to a fifth aspect, an embodiment of the present disclosure provides a service system access method, including: obtaining a service request message and encrypting the service request message; and sending an encrypted service request message to a secure transmission proxy apparatus.

In a first possible implementation manner of the fifth aspect, with reference to the fifth aspect, before the encrypting the service request message, the method further includes: loading a security certificate published by the secure transmission proxy apparatus.

In a second possible implementation manner of the fifth aspect, with reference to the fifth aspect and the first possible implementation manner of the fifth aspect, the service request message carries a first protocol identifier.

The embodiments of the present disclosure provide the service access method and the apparatus. A secure transmission proxy apparatus receives a service request message sent by a client and decrypts the service request message, where the service request message includes a service type; performs verification on service permission of a decrypted service request message according to the service type; performs protocol conversion on the decrypted service request message if the service permission verification succeeds; and sends a service request message obtained after the protocol conversion to a service server side, so that the service server side executes a corresponding service according to the service request message obtained after the protocol conversion. In this solution, the secure transmission proxy apparatus may decrypt a service request sent by a client on the Internet and perform verification on service permission, and each service server side no longer publishes a certificate and performs permission verification separately. Therefore, workload of reconstruction and maintenance of the service server side is reduced. In addition, a permission verification method may be formulated and maintained more effectively, which reduces networking costs, and communication security is enhanced because verification is performed on service permission of the decrypted service request message according to the service type.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
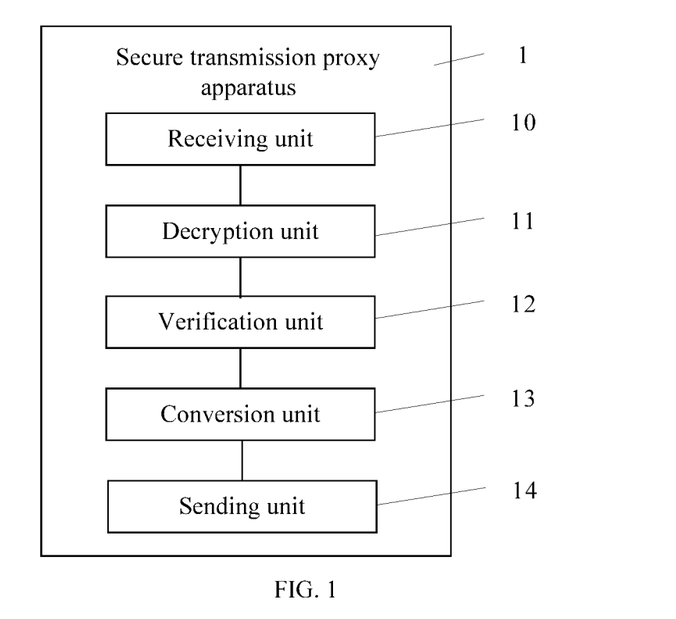
FIG. 1 is a schematic structural diagram of a secure transmission proxy apparatus according to an embodiment of the present disclosure.

This embodiment of the present disclosure provides a secure transmission proxy apparatus 1. As shown in FIG. 1, the apparatus 1 may include: a receiving unit 10 configured to receive a service request message sent by a client; a decryption unit 11 configured to decrypt the service request message, where the service request message includes a service type; a verification unit 12 configured to perform verification on service permission of a decrypted service request message according to the service type; a conversion unit 13 configured to perform protocol conversion on the decrypted service request message if the service permission verification succeeds; and a sending unit 14 configured to send a service request message obtained after the protocol conversion to a service server side, so that the service server side executes a corresponding service according to the service request message obtained after the protocol conversion.

Further, the service request message further includes at least a message channel and user information.

The verification unit 12 is configured to: perform first verification on the service permission according to the message channel and the service type, and perform second verification on the service permission according to the user information and the service type if the first verification succeeds.

The conversion unit 13 is configured to perform protocol conversion on the decrypted service request message after the second verification succeeds.

Further, the verification unit 12 is specifically configured to search a preset database for a first service type corresponding to the message channel, where the first verification succeeds if the service type is any service type in the first service type.

Optionally, the verification unit 12 is specifically configured to search the preset database for a first permission value corresponding to the user information and search the preset database for a second permission value corresponding to the service type, where the second verification succeeds if the first permission value is greater than or equal to the second permission value.

The conversion unit 13 is configured to perform protocol conversion on the decrypted service request message after the second verification succeeds.

Optionally, the verification unit 12 is specifically configured to: search the preset database for a first home service system and a third permission value that are corresponding to the user information, and search the preset database for a second home service system and a fourth permission value that are corresponding to the service type, where the second verification succeeds if the first home service system is the same as the second home service system and the third permission value is greater than or equal to the fourth permission value.

The conversion unit 13 is configured to perform protocol conversion on the decrypted service request message after the second verification succeeds.

Further, the decrypted service request message carries a first protocol identifier; and the conversion unit 13 is specifically configured to convert the first protocol identifier carried in the decrypted service request message to a second protocol identifier that can be identified by the service server side.

Figure 2:
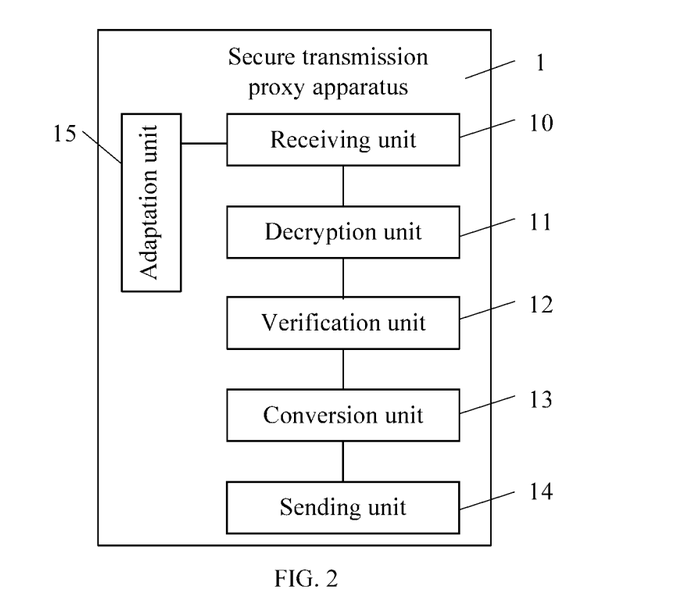
FIG. 2 is a schematic structural diagram of a secure transmission proxy apparatus according to an embodiment of the present disclosure.

Further, as shown in FIG. 2, the apparatus further includes: an adaptation unit 15 configured to perform protocol adaptation on the service request message.

Further, the sending unit 14 is further configured to publish a security certificate to the client, so that the client encrypts the service request message according to the security certificate.

Optionally, the sending unit 14 is further configured to send a request failure message to the client if the service permission verification fails.

This embodiment of the present disclosure provides the secure transmission proxy apparatus. The secure transmission proxy apparatus receives a service request message sent by a client and decrypts the service request message, where a decrypted service request message includes a service type; performs verification on service permission of the decrypted service request message according to the service type; performs protocol conversion on the decrypted service request message if the service permission verification succeeds; and sends a service request message obtained after the protocol conversion to a service server side, so that the service server side executes a corresponding service according to the service request message obtained after the protocol conversion. In this solution, the secure transmission proxy apparatus may decrypt a service request sent by a client on the Internet and perform verification on service permission, and each service server side no longer publishes a certificate and performs permission verification separately. Therefore, workload of reconstruction and maintenance of the service server side is reduced. In addition, a permission verification method may be formulated and maintained more effectively, which reduces networking costs, and communication security is enhanced because verification is performed on service permission of the decrypted service request message according to the service type.

Embodiment 2

Figure 3:
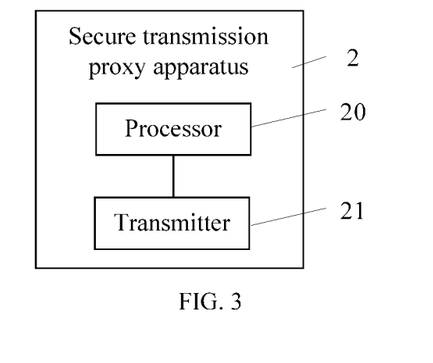
FIG. 3 is a schematic structural diagram of a secure transmission proxy apparatus according to an embodiment of the present disclosure.

This embodiment of the present disclosure provides a secure transmission proxy apparatus 2. As shown in FIG. 3, the apparatus 2 may include a processor 20 and a transmitter 21, where: the processor 20 is configured to receive a service request message sent by a client and decrypt the service request message, where the service request message includes a service type; the processor 20 is configured to perform verification on service permission of a decrypted service request message according to the service type; the processor 20 is configured to perform protocol conversion on the decrypted service request message if the service permission verification succeeds; and the transmitter 21 is configured to send a service request message obtained after the protocol conversion to a service server side, so that the service server side executes a corresponding service according to the service request message obtained after the protocol conversion.

Further, the service request message further includes at least a message channel and user information.

The processor 20 is configured to: perform first verification on the service permission according to the message channel and the service type, perform second verification on the service permission according to the user information and the service type if the first verification succeeds, and perform protocol conversion on the decrypted service request message after the second verification succeeds.

Further, the processor 20 is specifically configured to search a preset database for a first service type corresponding to the message channel, where the first verification succeeds if the service type is any service type in the first service type.

Optionally, the processor 20 is specifically configured to search the preset database for a first permission value corresponding to the user information and search the preset database for a second permission value corresponding to the service type, where the second verification succeeds if the first permission value is greater than or equal to the second permission value, and perform protocol conversion on the decrypted service request message after the second verification succeeds.

Optionally, the processor 20 is specifically configured to: search the preset database for a first home service system and a third permission value that are corresponding to the user information, and search the preset database for a second home service system and a fourth permission value that are corresponding to the service type, where the second verification succeeds if the first home service system is the same as the second home service system and the third permission value is greater than or equal to the fourth permission value, and perform protocol conversion on the decrypted service request message after the second verification succeeds.

Further, the decrypted service request message carries a first protocol identifier, and the processor 20 is specifically configured to convert the first protocol identifier carried in the decrypted service request message to a second protocol identifier that can be identified by the service server side.

Further, the processor 20 is further configured to perform protocol adaptation on the service request message.

Further, the transmitter 21 is further configured to publish a security certificate to the client, so that the client encrypts the service request message according to the security certificate.

Optionally, the transmitter 21 is further configured to send a request failure message to the client if the service permission verification fails.

This embodiment of the present disclosure provides the secure transmission proxy apparatus. The secure transmission proxy apparatus receives a service request message sent by a client and decrypts the service request message, where a decrypted service request message includes a service type; performs verification on service permission of the decrypted service request message according to the service type; performs protocol conversion on the decrypted service request message if the service permission verification succeeds; and sends a service request message obtained after the protocol conversion to a service server side, so that the service server side executes a corresponding service according to the service request message obtained after the protocol conversion. In this solution, the secure transmission proxy apparatus may decrypt a service request sent by a client on the Internet and perform verification on service permission, and each service server side no longer publishes a certificate and performs permission verification separately. Therefore, workload of reconstruction and maintenance of the service server side is reduced. In addition, a permission verification method may be formulated and maintained more effectively, which reduces networking costs, and communication security is enhanced because verification is performed on service permission of the decrypted service request message according to the service type.

Embodiment 3

Figure 4:
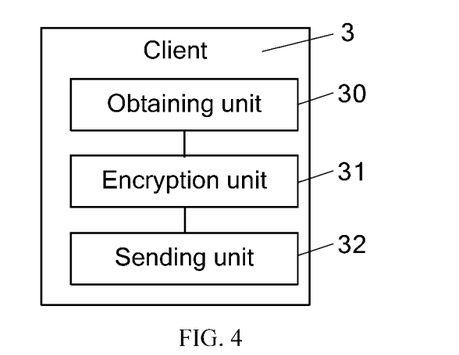
FIG. 4 is a schematic structural diagram of a client according to an embodiment of the present disclosure.

This embodiment of the present disclosure provides a client 3. As shown in FIG. 4, the client 3 may include: an obtaining unit 30 configured to obtain a service request message; an encryption unit 31 configured to encrypt the service request message; and a sending unit 32 configured to send an encrypted service request message to a secure transmission proxy apparatus.

Figure 5:
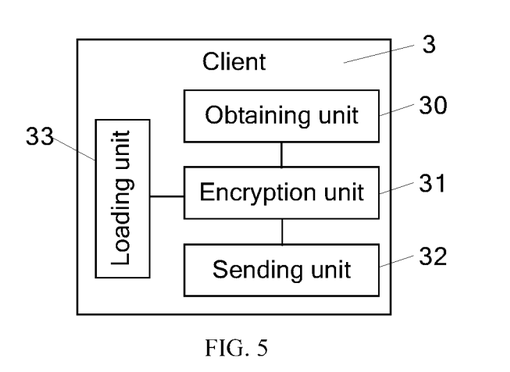
FIG. 5 is a schematic structural diagram of a client according to an embodiment of the present disclosure.

Further, as shown in FIG. 5, the client 3 further includes: a loading unit 33 configured to load a security certificate published by the secure transmission proxy apparatus.

Further, the service request message carries a first protocol identifier.

This embodiment of the present disclosure provides a client, where the client encrypts an obtained service request message and sends an encrypted service request message to a secure transmission proxy apparatus. In this solution, the secure transmission proxy apparatus may decrypt a service request sent by a client on the Internet and perform verification on service permission, and each service server side no longer publishes a certificate and performs permission verification separately. Therefore, workload of reconstruction and maintenance of the service server side is reduced. In addition, a permission verification method may be formulated and maintained more effectively, which reduces networking costs, and communication security is enhanced because verification is performed on service permission of the decrypted service request message according to the service type.

Embodiment 4

Figure 6:
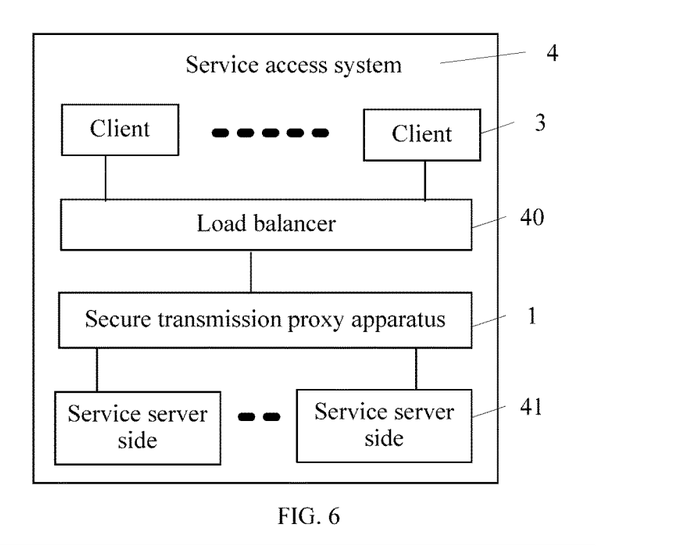
FIG. 6 is a schematic structural diagram of a service access system according to an embodiment of the present disclosure.

This embodiment of the present disclosure provides a service access system 4. As shown in FIG. 6, the system includes: at least one client 3 described above, a load balancer 40, the secure transmission proxy apparatus 1 described above, and at least one service server side 41, where the at least one client 3 is connected to the load balancer 40, the load balancer 40 is connected to the secure transmission proxy apparatus 1, and the secure transmission proxy apparatus 1 is connected to the at least one service server side 41.

Specifically, in the service access system, a working process of each client is basically the same as that of each service server side. One client of at least one client and one service server side of at least one service server side are used as an example to describe a working process of the service access system.

The secure transmission proxy apparatus publishes a security certificate to the client, and the client loads the security certificate published by the secure transmission proxy apparatus. The client encrypts a service request message according to the security certificate and sends the service request message to the load balancer. The load balancer receives the service request message and sends the service request message to the secure transmission proxy apparatus. The secure transmission proxy apparatus receives the service request message and decrypts the service request message, where the service request message includes a service type; performs verification on service permission of a decrypted service request message according to the service type; performs protocol conversion on the decrypted service request message if the service permission verification succeeds; and sends a service request message obtained after the protocol conversion to the service server side. The service server side executes a corresponding service according to the service request message obtained after the protocol conversion.

The load balancer is a hardware device that distributes a network request to an available server in a server cluster by using various allocation algorithms, and enables a network visitor to obtain the best possible networking experience by managing incoming Web data traffic and increasing valid network bandwidth.

The security certificate is a private key for a user during online communication. In the communication process, the security certificate performs high intensity encryption on communication information of the user, so as to prevent the communication information from being stolen or modified by another user etc., and ensure security.

This embodiment of the present disclosure provides the service access system, where the system includes: at least one client, a load balancer, at least one service server side, and a secure transmission proxy apparatus, where the secure transmission proxy apparatus publishes a security certificate to the at least one client, the client loads the security certificate published by the secure transmission proxy apparatus and encrypts a service request message according to the security certificate, the secure transmission proxy apparatus decrypts the received service request message and performs permission verification, and sends, if the permission verification succeeds, a service request message obtained after protocol conversion to the service server side, and the service server side performs a corresponding service according to the service request message. In this solution, the secure transmission proxy apparatus may decrypt a service request sent by a client on the Internet and perform verification on service permission, and each service server side no longer publishes a certificate and performs permission verification separately. Therefore, workload of reconstruction and maintenance of the service server side is reduced. In addition, a permission verification method may be formulated and maintained more effectively, which reduces networking costs, and communication security is enhanced because verification is performed on service permission of the decrypted service request message according to a service type. A service operation between each client and the service server side only needs to be performed with respect to a unified security permission verification center, which also reduces workload of reconstruction and maintenance of the client.

Embodiment 5

Figure 7:
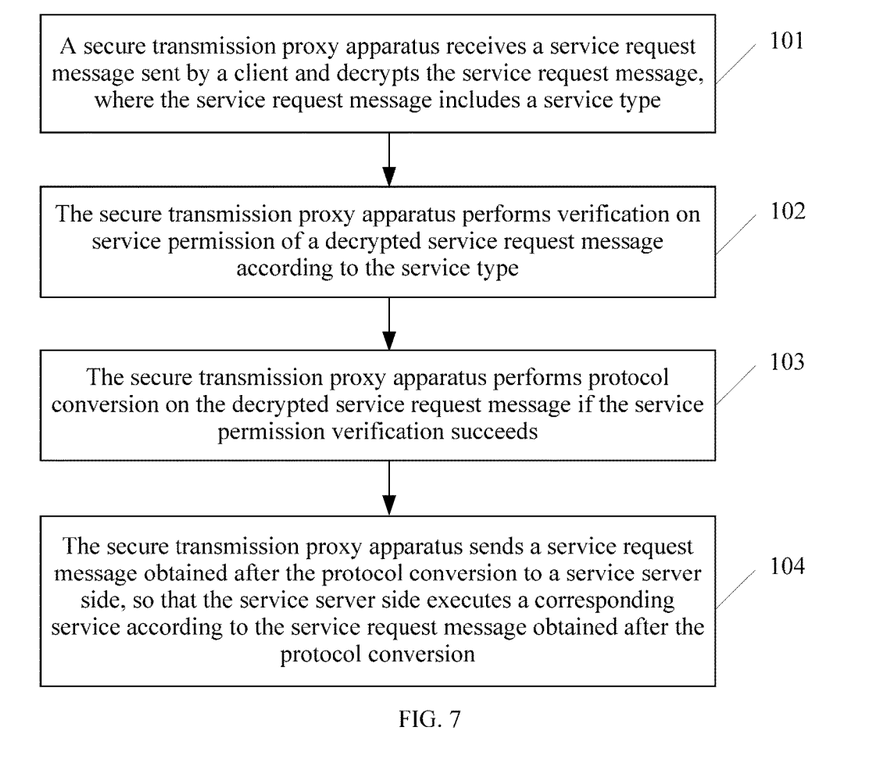
FIG. 7 is a schematic flowchart of a service access method according to an embodiment of the present disclosure.

This embodiment of the present disclosure provides a service access method. As shown in FIG. 7, the method may include:

101. A secure transmission proxy apparatus receives a service request message sent by a client and decrypts the service request message, where the service request message includes a service type.

Specifically, in the service access method provided in this embodiment of the present disclosure, a secure transmission proxy apparatus publishes, in a demilitarized zone (DMZ), a security certificate to a client on the Internet with respect to a security protocol that each client can support, and a manner in which each service server side separately publishes a security certificate to the client is no longer used. The secure transmission proxy apparatus may publish one security certificate to multiple clients, where the client may encrypt the service request message according to the security certificate, so as to ensure security of communication between the client and a service server side.

The DMZ is referred to as a demilitarized zone or an isolated zone. The DMZ is a special network area different from an external network or an internal network. Generally, servers such as a Web, a Mail, and a File Transfer Protocol (FTP) that allow access to an external network are connected to an internal port in the DMZ, and an entire internal network that needs to be protected is connected to a location behind a port in a trusted zone, so as to separate the internal network and the external network.

The security certificate is a private key for a user during online communication. In the communication process, the security certificate performs high intensity encryption on communication information of the user, so as to prevent the communication information from being stolen or modified by another user etc., and ensure security.

Specifically, the secure transmission proxy apparatus obtains the service request message sent by the client, where the service request message has been encrypted by the client according to the certificate published by the secure transmission proxy apparatus, and the secure transmission proxy apparatus decrypts the service request message, where the service request message may include the service type, a message channel, and user information, and may also include other information such as service content, which is not limited in this embodiment.

It should be noted that, the secure transmission proxy apparatus may decrypt the service request message according to a first preset algorithm, where the first preset algorithm is corresponding to an algorithm in which the client encrypts the service request message according to the security certificate. That is, the client encrypts the service request message according to the security certificate, and the secure transmission proxy apparatus may decrypt the encrypted service request message by using the first preset algorithm, where the first preset algorithm may be a decryption algorithm in some approaches, which is not limited in this embodiment.

It should be noted that, the secure transmission proxy apparatus may also publish the security certificate if the client needs to use a private encryption protocol to perform service interaction with the service server side, where the security certificate may be different from a security certificate applied in another service server side. The secure transmission proxy apparatus manages the privately encrypted security certificate, decryption of the service request message, and service permission verification.

102. The secure transmission proxy apparatus performs verification on service permission of a decrypted service request message according to the service type.

Specifically, the service request message described above may include the message channel, the user information, the service type, the service content, and the like. An implementation manner in which the secure transmission proxy apparatus performs service permission verification on the decrypted service request message according to the service type may be as follows: the secure transmission proxy apparatus performs first verification on the service permission according to the message channel and the service type, and performs second verification on the service permission according to the user information and the service type if the first verification succeeds.

A possible implementation manner in which the secure transmission proxy apparatus performs the first verification on the service permission according to the message channel and the service type is: the secure transmission proxy apparatus searches a preset database for a first service type corresponding to the message channel, where the first verification succeeds if the service type is any service type in the first service type.

A possible implementation manner in which the secure transmission proxy apparatus performs the second verification on the service permission according to the user information and the service type is: the secure transmission proxy apparatus searches the preset database for a first permission value corresponding to the user information, and searches the preset database for a second permission value corresponding to the service type, where the second verification succeeds if the first permission value is greater than or equal to the second permission value.

A possible implementation manner in which the secure transmission proxy apparatus performs the second verification on the service permission according to the user information and the service type is: the secure transmission proxy apparatus searches the preset database for a first home service system and a third permission value that are corresponding to the user information, and searches the preset database for a second home service system and a fourth permission value that are corresponding to the service type, where the second verification succeeds if the first home service system is the same as the second home service system and the third permission value is greater than or equal to the fourth permission value.

103. The secure transmission proxy apparatus performs protocol conversion on the decrypted service request message if the service permission verification succeeds.

Specifically, different sides in communication may use different communication protocols, and the different communication protocols do not identify a frame format transmission method of another party. Therefore, protocol conversion needs to be performed between network areas in which different protocols are used. If the client uses a first communication protocol and the service server side uses a second communication protocol, it may be understood that a message using the first communication protocol carries a first protocol identifier, a message using the second communication protocol carries a second protocol identifier, the decrypted service request message carries the first protocol identifier, and the service server side may identify the second communication protocol. Therefore, the secure transmission proxy apparatus needs to convert the first protocol identifier carried in the decrypted service request message to the second protocol identifier that can be identified by the service server side, that is, the secure transmission proxy apparatus converts the first communication protocol of the decrypted service request message to the second communication protocol that can be identified by the service server side. The protocol conversion in this embodiment of the present disclosure refers to converting a protocol of a message according to a protocol format indicated by the protocol identifier.

It should be noted that the secure transmission proxy apparatus may perform protocol conversion on the decrypted service request message according to a second preset algorithm, where the second preset algorithm may be a protocol conversion algorithm in some approaches, which is not limited in this embodiment.

104. The secure transmission proxy apparatus sends a service request message obtained after the protocol conversion to a service server side, so that the service server side executes a corresponding service according to the service request message obtained after the protocol conversion.

Specifically, after the service permission verification on the service request message succeeds, the secure transmission proxy apparatus sends the service request message obtained after the protocol conversion to the service server side, so that the service server side executes a corresponding service according to the service request message.

This embodiment of the present disclosure provides the service access method. A secure transmission proxy apparatus receives a service request message sent by a client and decrypts the service request message, where the service request message includes a service type; performs verification on service permission of a decrypted service request message according to the service type; performs protocol conversion on the decrypted service request message if the service permission verification succeeds; and sends a service request message obtained after the protocol conversion to a service server side, so that the service server side executes a corresponding service according to the service request message obtained after the protocol conversion. In this solution, the secure transmission proxy apparatus may decrypt a service request sent by a client on the Internet and perform verification on service permission, and each service server side no longer publishes a certificate and performs permission verification separately. Therefore, workload of reconstruction and maintenance of the service server side is reduced. In addition, a permission verification method may be formulated and maintained more effectively, which reduces networking costs, and communication security is enhanced because verification is performed on service permission of the decrypted service request message according to the service type.

Embodiment 6

Figure 8:
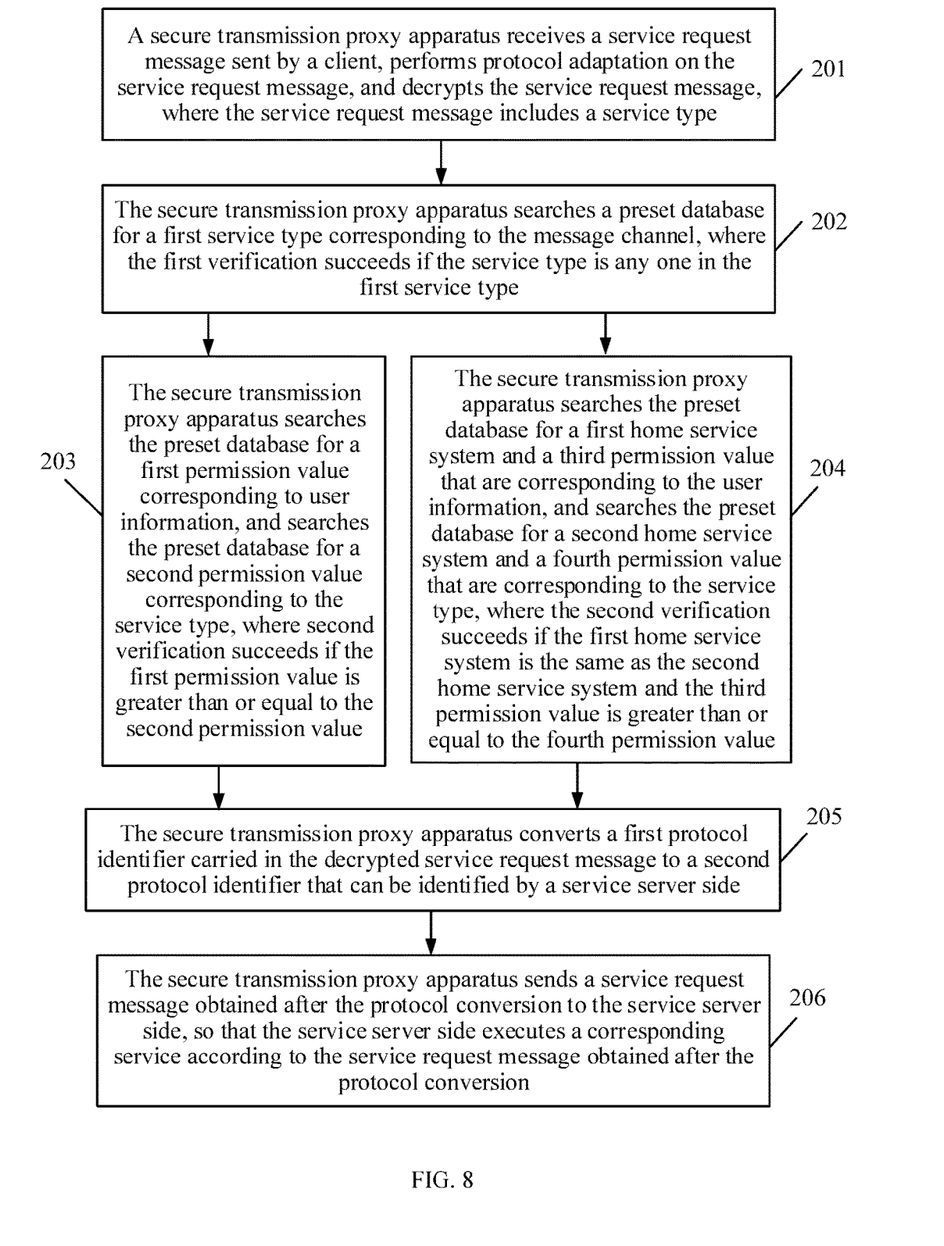
FIG. 8 is a schematic flowchart of a service access method according to an embodiment of the present disclosure.

This embodiment of the present disclosure provides a service access method. As shown in FIG. 8, the method includes:

201. A secure transmission proxy apparatus receives a service request message sent by a client, performs protocol adaptation on the service request message, and decrypts the service request message, where the service request message includes a service type.

Specifically, in the service access method provided in this embodiment of the present disclosure, a secure transmission proxy apparatus publishes, in a DMZ, a security certificate to a client on the Internet with respect to a security protocol that each client can support, and a manner in which each service server side separately publishes a security certificate to the client is no longer used. The secure transmission proxy apparatus may publish one security certificate to multiple clients, where the client may encrypt, according to the security certificate, a service request message that needs to be sent, so as to ensure security of communication between the client and a service server side.

The DMZ is referred to as a demilitarized zone or an isolated zone. The DMZ is a special network area different from an external network or an internal network. Generally, servers such as a Web, a Mail, and an FTP that allow access to an external network are connected to an internal port in the DMZ, and an entire internal network that needs to be protected is connected to a location behind a port in a trusted zone, so as to separate the internal network and the external network.

Specifically, the secure transmission proxy apparatus obtains the service request message sent by the client, where the service request message has been encrypted by the client according to the certificate published by the secure transmission proxy apparatus, and the secure transmission proxy apparatus performs protocol adaptation on the service request message, and decrypts a service request message obtained after the protocol adaptation, where the service request message obtained after decryption may specifically include a service type, a message channel, and user information, and may also include other information such as service content, which is not limited in this embodiment.

It should be noted that, the secure transmission proxy apparatus may decrypt the service request message according to a first preset algorithm, where the first preset algorithm is corresponding to an algorithm in which the client encrypts the service request message according to the security certificate. That is, the client encrypts the service request message according to the security certificate, and the secure transmission proxy apparatus may decrypt the encrypted service request message by using the first preset algorithm, where the first preset algorithm may be a decryption algorithm in some approaches, which is not limited in this embodiment.

It should be noted that, the secure transmission proxy apparatus may also publish the security certificate if the client needs to use a private encryption protocol to perform service interaction with the service server side, where the security certificate may be different from a security certificate applied in another service server side. The secure transmission proxy apparatus manages the privately encrypted security certificate, decryption of the service request message, and service permission verification.

202. The secure transmission proxy apparatus searches a preset database for a first service type corresponding to a message channel, where the first verification succeeds if the service type is any service type in the first service type.

As described above, the service request message obtained after decryption may include the message channel, the user information, the service type, the service content, and may also include other information, which is not limited in this embodiment.

The message channel is a medium for sending the service request message, for example, an electronic channel e-care, and a voice channel interactive voice response (IVR).

Exemplarily, first verification is performed on the service permission. As shown in Table 1, if executive service types corresponding to different service channels are preset in a preset first database, that is, the e-care (electronic service) channel allows a service to request the following services: query customer information, recharge by voucher card, change primary offering, and change supplementary offering. However, the IVR (voice service) channel allows a service to request only the following services: recharge by voucher card and change supplementary offering. If the IVR channel requests a service that is not allowed to be executed (for example, change primary offering), the service request is rejected.

TABLE 1

| Service channel | Service type |
| --- | --- |
| IVR | Recharge by voucher card |
| IVR | Change supplementary offering |
| e-care | Change Primary offering |
| e-care | Query Customer Information |
| e-care | Change supplementary offering |
| e-care | Recharge by voucher card |

Exemplarily, if a header of the decrypted service request message is:
Channel ID: IVR;
Service Type: Recharge by voucher card.
That is, the message channel is IVR and the service type is recharge by voucher card.

A first service type that is corresponding to the message channel IVR and that is searched for by the secure transmission proxy apparatus in the preset first database (as shown in Table 1) includes: Recharge by voucher card and Change supplementary offering. If the service type Recharge by voucher card is the same as Recharge by voucher card in the first service type, the first verification succeeds, that is, Recharge by voucher card is in a range of services that the IVR channel allows to apply for, and the service request may be accepted.

It should be noted that, the first service type that is corresponding to the message channel and that is searched for in the preset database may be one or more service types, and it may be determined that the first verification succeeds as long as the service type is the same as any service type in the first service type.

Further, the secure transmission proxy apparatus searches the preset database for the first service type corresponding to the message channel. If the service type is different from any service type in the first service type, the first verification fails, and the secure transmission proxy apparatus sends a request failure message to the client.

Exemplarily, if a header of the decrypted service request message is:
Channel ID: IVR;
Service Type: Change Primary offering.
That is, the message channel is IVR and the service type is change primary offering.

A first service type that is corresponding to the message channel IVR and that is searched for by the secure transmission proxy apparatus in the preset first database (as shown in Table 1) includes: Recharge by voucher card and Change supplementary offering. If the service type Change Primary offering is different from either of Recharge by voucher card and Change supplementary offering that are in the first service type, the first permission verification according to the message channel and the service type fails, that is, Change Primary offering is not in a range of services that the IVR channel allows to apply for, the service request cannot pass the permission verification, and the service request is rejected for acceptance.

It should be noted that, the first service type that is corresponding to the message channel and that is searched for in the preset database may be one or more service types, and it may be determined that the first verification fails if the service type is different from any service type in the first service type.

Optionally, if service server sides in an internal network use a unified operation and management mechanism, in this case, user IDs and passwords of the service server sides are kept consistent. When verification is performed on the service request message sent on the Internet, there is no need to consider a service server side that finally processes the service request message and whether a user identifier (ID) included in the service request message is an authorized operating user of the service server side. Therefore, the following step 203 may be used to perform verification.

203. The secure transmission proxy apparatus searches the preset database for a first permission value corresponding to user information, and searches the preset database for a second permission value corresponding to the service type, where second verification succeeds if the first permission value is greater than or equal to the second permission value.

The user information may include a user ID and a password. As described above, the decrypted service request message may include the message channel, the user information, the service type, the service content, and may also include other information, which is not limited in this embodiment.

For the following brief description, it is assumed that a permission value is divided into three levels: S, A, and B, which are ranked in descending order, that is, a permission value in the level S is the largest, a permission value in the level B is the smallest, and a permission value in the level A is between the level S and the level B.

Exemplarily, if a header of the decrypted request message is:
Channel ID: e-care;
Service Type: Change Primary offering;
Operator ID: operator1.
That is, the message channel is e-care (electronic service), the service type is change primary offering, and the user ID is operator1.

A first permission value that is corresponding to the user information operator 1 and that is searched for by the secure transmission proxy apparatus in a preset second database (as shown in Table 2) is S. A second permission value that is corresponding to the service type Change Primary offering and that is searched for in the preset database (as shown in Table 3) is S. If the first permission value S of operator 1 is equal to the second permission value S, the second permission verification succeeds and the service request may be accepted.

TABLE 2

| User ID | User permission value |
| --- | --- |
| operator1 | S |
| operator2 | A |

TABLE 3

| Service type | Permission value of a service type |
| --- | --- |
| Change Primary offering | S |
| Query Customer Information | B |
| Change supplementary offering | A |
| Recharge by voucher card | S |

Exemplarily, if a header of the decrypted request message is:
Channel ID: e-care;
Service Type: Query Customer Information;
Operator ID: operator1.
That is, the message channel is e-care (electronic service), the service type is query customer information, and the user ID is operator 1.

A first permission value that is corresponding to the user information operator 1 and that is searched for by the secure transmission proxy apparatus in a preset second database (as shown in Table 2) is S. A second permission value that is corresponding to the service type Query Customer Information and that is searched for in a preset third database (as shown in Table 3) is B. If the first permission value S of operator 1 is greater than the second permission value S, the second verification succeeds and the service request may be accepted.

Exemplarily, if a header of the decrypted request message is:
  Channel ID: e-care;
  Service Type: Change supplementary offering;
  Operator ID: operator2.
That is, the message channel is e-care, the service type is change supplementary offering, and the user ID is operator 2.

A first permission value that is corresponding to the user information operator 2 and that is searched for by the secure transmission proxy apparatus in a preset second database (as shown in Table 2) is A. A second permission value that is corresponding to the service type Change supplementary offering and that is searched for in a preset third database (as shown in Table 3) is A. If the first permission value A of operator 1 is equal to the second permission value A, the second verification succeeds and the service request may be accepted.

Further, the secure transmission proxy apparatus searches the preset database for the first permission value corresponding to the user information, and searches the preset database for the second permission value corresponding to the service type. If the first permission value is less than the second permission value, the second verification according to the user information and the service type fails, and the secure transmission proxy apparatus sends a request failure message to the client.

Exemplarily, if a header of the decrypted request message is:
  Channel ID: e-care;
  Service Type: Change Primary offering;
  Operator ID: operator2.
That is, the message channel is e-care, the service type is change supplementary offering, and the user ID is operator 2.

A first permission value that is corresponding to the user information operator 2 and that is searched for by the secure transmission proxy apparatus in a preset second database (as shown in Table 2) is A. A second permission value that is corresponding to the service type Change Primary offering and that is searched for in a preset third database (as shown in Table 3) is S. If the first permission value A of operator 1 is less than the second permission value S, the second verification fails and the service request cannot be accepted.

Optionally, if each service server side in an internal network separately uses an independent management mechanism, in this case, when verification is performed on the service request message sent on the Internet, there is a need to consider a service server side that finally processes the service request message and whether a user ID passed in the service request message is an authorized operating user of the service server side. Therefore, the following step 204 may be used to perform verification.

204. The secure transmission proxy apparatus searches the preset database for a first home service system and a third permission value that are corresponding to the user information, and searches the preset database for a second home service system and a fourth permission value that are corresponding to the service type, where the second verification succeeds if the first home service system is the same as the second home service system and the third permission value is greater than or equal to the fourth permission value.

As described above, the user information may include a user ID and a password. The decrypted service request message may include the message channel, the user information, the service type, the service content, and may also include other information, which is not limited in this embodiment.

For the following brief description, it is assumed that a permission value is divided into three levels: S, A, and B, which are ranked in descending order, that is, a permission value in the level S is the largest, a permission value in the level B is the smallest, and a permission value in the level A is between the level S and the level B.

Exemplarily, if a header of the decrypted request message is:
  Channel ID: e-care;
  Service Type: Change Primary offering;
  Operator ID: operator1.
That is, the message channel is e-care, the service type is change primary offering, and the user ID is operator 1.

The secure transmission proxy apparatus searches a preset fourth database (as shown in Table 4) for a first home service system CRM and a third permission value S that are corresponding to the user information operator 1, and searches a preset fifth database (as shown in Table 5) for a second home service system CRM and a fourth permission value S that are corresponding to the service type Change Primary offering. If the first home service system is the same as the second home service system, that is, the user ID and the requested service type belong to a same service system, and the third permission value is equal to the fourth permission value, the second verification succeeds and the service request may be accepted.

Exemplarily, if a header of the decrypted service request message is:
  Channel ID: e-care;
  Service Type: Query Customer Information;
  Operator ID: operator1.
That is, the message channel is e-care, the service type is query customer information, and the user ID is operator 1.

The secure transmission proxy apparatus searches a preset fourth database (as shown in Table 4) for a first home service system customer relationship management (CRM) and a third permission value S that are corresponding to the user information operator 1, and searches a preset fifth database (as shown in Table 5) for a second home service system CRM and a fourth permission value B that are corresponding to the service type Query Customer Information. If the first home service system is the same as the second home service system, that is, the user ID and the requested service type belong to a same service system, and the third permission value is greater than the fourth permission value, the second verification succeeds and the service request may be accepted.

TABLE 4

| User ID | Home service system | User permission value |
| --- | --- | --- |
| operator1 | CRM | S |
| operator2 | CBS | A |
| operator2 | CBS | S |

TABLE 5

| Service type | Home service system | Permission value of a service type |
| --- | --- | --- |
| Change Primary offering | CRM | S |
| Query Customer Information | CRM | B |
| Change supplementary offering | CRM | A |
| Recharge by voucher card | CBS | S |

Further, the secure transmission proxy apparatus searches the preset database for a first home service system and a third permission value that are corresponding to the user information, and searches the preset database for a second home service system and a fourth permission value that are corresponding to the service type. If the first home service system is different from the second home service system, or if the third permission value is less than the fourth permission value, the second verification fails and the secure transmission proxy apparatus sends a request failure message to the client.

Exemplarily, if a header of the decrypted service request message is:
Channel ID: e-care;
Service Type: Change supplementary offering;
Operator ID: operator3.
That is, the message channel is e-care, the service type is change supplementary offering, and the user ID is operator 3.

The secure transmission proxy apparatus searches a preset fourth database (as shown in Table 4) for a first home service system converting billing system (CBS) and a third permission value S that are corresponding to the user information operator 3, and searches a preset fifth database (as shown in Table 5) for a second home service system CRM and a fourth permission value A that are corresponding to the service type Change supplementary offering. Although the third permission value is greater than the fourth permission value, the user ID and the requested service type do not belong to a same service system; in this case, the second verification fails and the service request cannot be accepted.

Exemplarily, if a header of the decrypted service request message is:
Channel ID: e-care;
Service Type: Recharge by voucher card;
Operator ID: operator2.
That is, the message channel is e-care, the service type is recharge by voucher card, and the user ID is operator 2.

The secure transmission proxy apparatus searches a preset fourth database (as shown in Table 4) for a first home service system CBS and a third permission value S that are corresponding to the user information operator 2, and searches a preset fifth database (as shown in Table 5) for a second home service system CBS and a fourth permission value S that are corresponding to the service type Recharge by voucher card. Although the user ID and the requested service type belong to a same service system, the third permission value is less than the fourth permission value; in this case, the second verification fails and the service request cannot be accepted.

205. The secure transmission proxy apparatus converts a first protocol identifier carried in the decrypted service request message to a second protocol identifier that can be identified by a service server side.

Specifically, different sides in communication may use different communication protocols, and the different communication protocols do not identify a frame format transmission method of another party. Therefore, protocol conversion needs to be performed between network areas in which different protocols are used. If the client uses a first communication protocol and the service server side uses a second communication protocol, it may be understood that a message using the first communication protocol carries a first protocol identifier, a message using the second communication protocol carries a second protocol identifier, the decrypted service request message carries the first protocol identifier, and the service server side may identify the second communication protocol. Therefore, the secure transmission proxy apparatus needs to convert the first protocol identifier carried in the decrypted service request message to the second protocol identifier that can be identified by the service server side, that is, the secure transmission proxy apparatus converts the first communication protocol of the decrypted service request message to the second communication protocol that can be identified by the service server side. The protocol conversion in this embodiment of the present disclosure refers to converting a protocol of a message according to a protocol format indicated by the protocol identifier.

Exemplarily, if the client uses an https protocol, and the service server side uses an http protocol, the secure transmission proxy apparatus needs to convert the https protocol to the http protocol.

It should be noted that the secure transmission proxy apparatus may perform protocol conversion on the decrypted service request message according to a second preset algorithm, where the second preset algorithm may be a protocol conversion algorithm in some approaches, which is not limited in this embodiment.

206. The secure transmission proxy apparatus sends a service request message obtained after the protocol conversion to the service server side, so that the service server side executes a corresponding service according to the service request message obtained after the protocol conversion.

Specifically, after the service permission verification on the service request message succeeds, the secure transmission proxy apparatus sends the service request message obtained after the protocol conversion to the service server side, so that the service server side executes a corresponding service according to the service request message.

This embodiment of the present disclosure provides the service access method. A secure transmission proxy apparatus receives a service request message sent by a client and decrypts the service request message, where the service request message includes a service type; performs verification on service permission of a decrypted service request message according to the service type; performs protocol conversion on the decrypted service request message if the service permission verification succeeds; and sends a service request message obtained after the protocol conversion to a service server side, so that the service server side executes a corresponding service according to the service request message obtained after the protocol conversion. In this solution, the secure transmission proxy apparatus may decrypt a service request sent by a client on the Internet and perform verification on service permission, and each service server side no longer publishes a certificate and performs permission verification separately. Therefore, workload of reconstruction and maintenance of the service server side is reduced. In addition, a permission verification method may be formulated and maintained more effectively, which reduces networking costs, and communication security is enhanced because verification is performed on service permission of the decrypted service request message according to the service type, a message channel, and user information.

Embodiment 7

Figure 9:
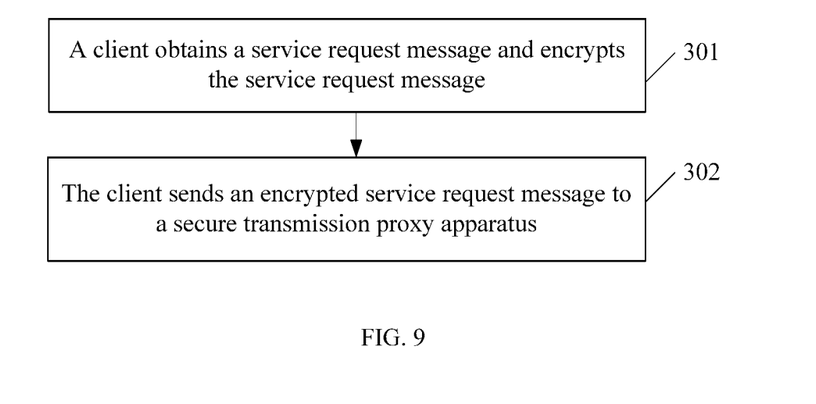
FIG. 9 is a schematic flowchart of a service access method according to an embodiment of the present disclosure.

This embodiment of the present disclosure provides a service system access method. As shown in FIG. 9, the method includes:

301. A client obtains a service request message and encrypts the service request message.

Specifically, when a user needs to perform a service operation, the client needs to encrypt a service request message obtained by means of a user operation. First, the client needs to load a security certificate that is published by a secure transmission proxy apparatus to the client. After obtaining the service request message, the client encrypts the service request message according to the security certificate, where the security certificate is a private key for the user during online communication. In the communication process, the security certificate performs high intensity encryption on communication information of the user, so as to prevent the communication information from being stolen or modified by another user etc., and ensure security.

302. The client sends an encrypted service request message to a secure transmission proxy apparatus.

Specifically, the client sends the service request message encrypted by the security certificate to the secure transmission proxy apparatus, where the service request message carries a first protocol identifier, and the first protocol identifier is used to indicate a protocol used by the client.

This embodiment of the present disclosure provides the service access method, where a client encrypts an obtained service request message and sends an encrypted service request message to a secure transmission proxy apparatus. In this solution, the secure transmission proxy apparatus may decrypt a service request sent by a client on the Internet and perform verification on service permission, and each service server side no longer publishes a certificate and performs permission verification separately. Therefore, workload of reconstruction and maintenance of the service server side is reduced. In addition, a permission verification method may be formulated and maintained more effectively, which reduces networking costs, and communication security is enhanced because verification is performed on service permission of the decrypted service request message according to a service type, a message channel, and user information.

It may be clearly understood by a person skilled in the art that, for the purpose of convenient and brief description, division of the foregoing functional modules is used as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed.

In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A secure transmission proxy apparatus comprising:
   a receiver configured to receive a first service request message from a client;
   a processor coupled to the receiver and configured to:
      decrypt the first service request message to obtain a decrypted service request message comprising a message channel, user information, a service permission and a service type;
      perform first verification of the service permission according to the message channel and the service type;
      perform second verification of the service permission according to the user information and the service type when the first verification is successful; and
      perform protocol conversion on the decrypted service request message when the second verification is successful; and
   a transmitter coupled to the processor and the receiver, and wherein the transmitter is configured to:
      obtain a second service request message after the protocol conversion on the decrypted service request message; and transmit the second service request message to a service server side to permit the service server side to execute a corresponding service according to the second service request message.

2. The secure transmission proxy apparatus of claim 1, wherein the processor is further configured to search a preset database for a first service type corresponding to the message channel, and wherein the first verification is successful when the service type is in the first service type.

3. The secure transmission proxy apparatus of claim 1, wherein the processor is further configured to:
search a preset database for a first permission value corresponding to the user information; and
search the preset database for a second permission value corresponding to the service type, and wherein the second verification is successful when the first permission value is greater than or equal to the second permission value.

4. The secure transmission proxy apparatus of claim 3, wherein the processor is further configured to:
search the preset database for a first home service system and a third permission value corresponding to the user information; and
search the preset database for a second home service system and a fourth permission value corresponding to the service type, wherein the second verification is successful when the first home service system is the same as the second home service system and the third permission value is greater than or equal to the fourth permission value.

5. The secure transmission proxy apparatus of claim 1, wherein the decrypted service request message comprising a protocol identifier, and wherein the processor is further configured to convert the protocol identifier to a second protocol identifier that is identifiable by the service server side.

6. The secure transmission proxy apparatus of claim 1, wherein the processor is further configured to publish a security certificate, and wherein the transmitter is further configured to send the security certificate to the client.

7. A service access system comprising:
a load balancer configured to:
receive a service request message from a client; and
send the service request message to a secure transmission proxy apparatus;
a service server side;
the secure transmission proxy apparatus coupled to the load balancer and the service server side, wherein the secure transmission proxy apparatus is configured to:
decrypt the service request message to obtain a decrypted service request message, wherein the decrypted service request message comprises a message channel, user information, a service permission and a service type;
perform first verification of the service permission according to the message channel and the service type;
perform second verification of the service permission according to the user information and the service type when the first verification is successful; and
publish a security certificate to the client; and
the client coupled to the secure transmission proxy apparatus and configured to:
receive and load the published security certificate;
encrypt the service request message according to the security certificate; and
send the service request message to the load balancer.

8. The service access system of claim 7, wherein the secure transmission proxy apparatus is configured to perform the first verification by searching a preset database for a first service type corresponding to the message channel, and wherein the first verification is successful when the service type is in the first service type.

9. The service access system of claim 7, wherein the secure transmission proxy apparatus is configured to perform the second verification by:
search a preset database for a first permission value corresponding to the user information; and
search the preset database for a second permission value corresponding to the service type, wherein the second verification is successful when the first permission value is greater than or equal to the second permission value.

10. The service access system of claim 9, wherein the secure transmission proxy apparatus is further configured to perform the second verification by:
search the preset database for a first home service system and a third permission value corresponding to the user information; and
search the preset database for a second home service system and a fourth permission value corresponding to the service type, wherein the second verification is successful when the first home service system is the same as the second home service system and the third permission value is greater than or equal to the fourth permission value.

11. A service access method comprising:
receiving, from a client, a first service request message;
decrypting the first service request message to obtain a decrypted service request message, wherein the decrypted service request message comprises a message channel, user information, a service permission and a service type;
performing first verification of the service permission according to the message channel and the service type;
performing second verification on the service permission according to the user information and the service type when the first verification is successful; and
performing protocol conversion on the decrypted service request message when the second verification is successful;
obtaining a second service request message after the protocol conversion on the decrypted service request message; and
transmitting, to a service server side, the second service request message to permit the service server side to execute a corresponding service according to the second service request message.

12. The service access method of claim 11, wherein performing the first verification comprises searching a preset database for a first service type corresponding to the message channel, and wherein the first verification is successful when the service type is in the first service type.

13. The service access method of claim 11, wherein performing the second verification comprises:
searching a preset database for a first permission value corresponding to the user information; and
searching the preset database for a second permission value corresponding to the service type, wherein the second verification is successful when the first permission value is greater than or equal to the second permission value.

14. The service access method of claim 13, wherein performing the second verification comprises:

searching the preset database for a first home service system and a third permission value corresponding to the user information; and searching the preset database for a second home service system and a fourth permission value corresponding to the service type, wherein the second verification is successful when the first home service system is the same as the second home service system and the third permission value is greater than or equal to the fourth permission value.

15. The service access method of claim 11, wherein the decrypted service request message comprises a protocol identifier, and wherein the method further comprises converting the protocol identifier to a second protocol identifier that is identifiable by the service server side.

16. The service access method of claim 11, further comprising:
publishing a security certificate; and
sending the security certificate to the client.

* * * * *